United States Patent [19]

Poveromo

[11] 4,395,749
[45] Jul. 26, 1983

[54] BOAT TRAILER LAMP AND LICENSE PLATE SUPPORT

[76] Inventor: George A. Poveromo, 14135 N. Miami Ave., Miami, Fla. 33168

[21] Appl. No.: 261,078

[22] Filed: May 6, 1981

[51] Int. Cl.³ .............................. B60Q 1/26; B60Q 1/56
[52] U.S. Cl. ...................................... 362/83; 248/284; 248/289.1; 248/291; 248/293; 280/414.1; 362/80; 362/269; 362/28.5; 362/427
[58] Field of Search ...................... 362/61, 66, 80, 82, 362/83, 428, 285, 269, 427; 248/278, 282, 284, 289.1, 291, 293, 294; 280/414 R, 414 B

[56] References Cited

U.S. PATENT DOCUMENTS

| | | | |
|---|---|---|---|
| 2,538,655 | 1/1951 | Preston | 248/284 |
| 2,550,325 | 4/1951 | Breed | 248/284 |
| 2,796,515 | 6/1957 | Waskie | 362/82 |
| 3,586,270 | 6/1971 | Loffler et al. | 362/61 |
| 3,833,800 | 9/1974 | Stewart | 362/61 |
| 3,885,146 | 5/1975 | Whitley | 363/61 |
| 3,887093 | 6/1975 | Howell | 362/61 |

*Primary Examiner*—Irwin Gluck
*Attorney, Agent, or Firm*—Sughrue, Mion, Zinn, Macpeak and Seas

[57] ABSTRACT

A boat trailer has a base plate attached to the trailer fender. A hollow bar is pivotably attached at one end to the base plate and releasably fastened near its opposite end to the rear of the fender. A bracket for supporting a lamp and license plate is attached at the opposite end of the bar. Electrical wires extend from the vehicle's electrical system through the bar to the lamp. The bar is fastened to the base in such a fashion that the lamp and license plate are repositionable from the rear of the trailer where the lamp and license plate are located during over-the-road travel to a position forward of the fender prior to launching a boat from the trailer. In this regard, the bar is released from the fender and rotated 180° so that the lamp and license plate are forward of the fender whereby the lamp and associated electrical wiring will not contact the water during launching of the boat thus avoiding dangerous electrical conditions.

6 Claims, 8 Drawing Figures

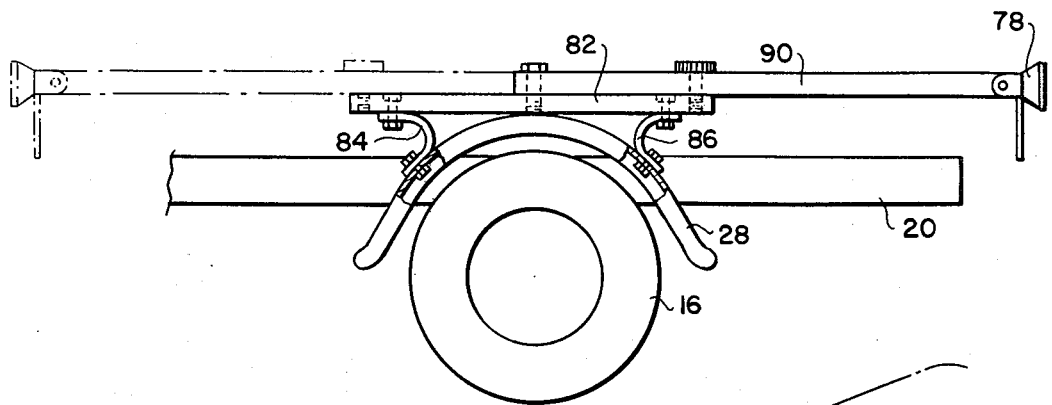
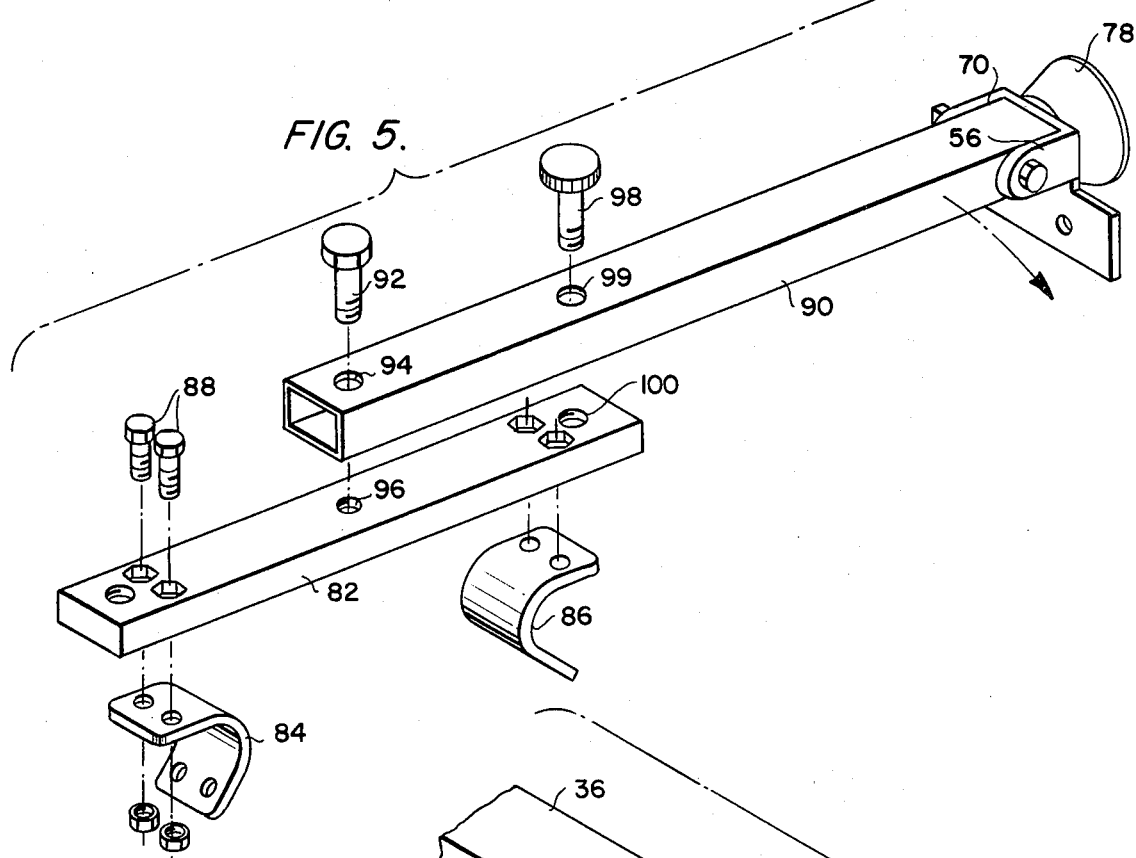
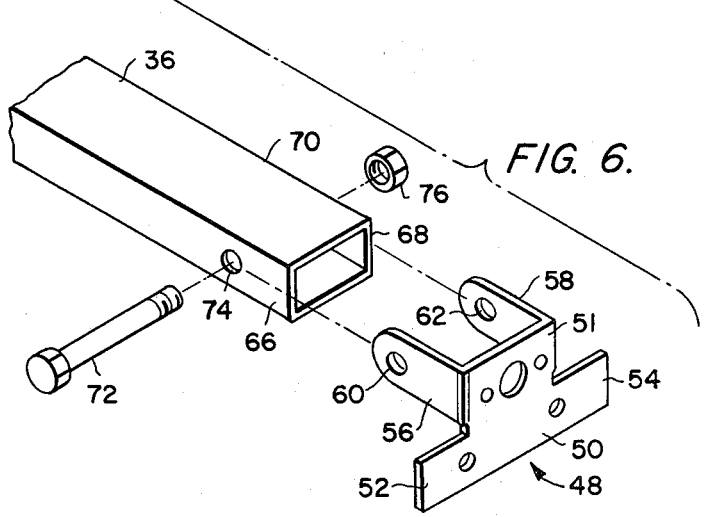

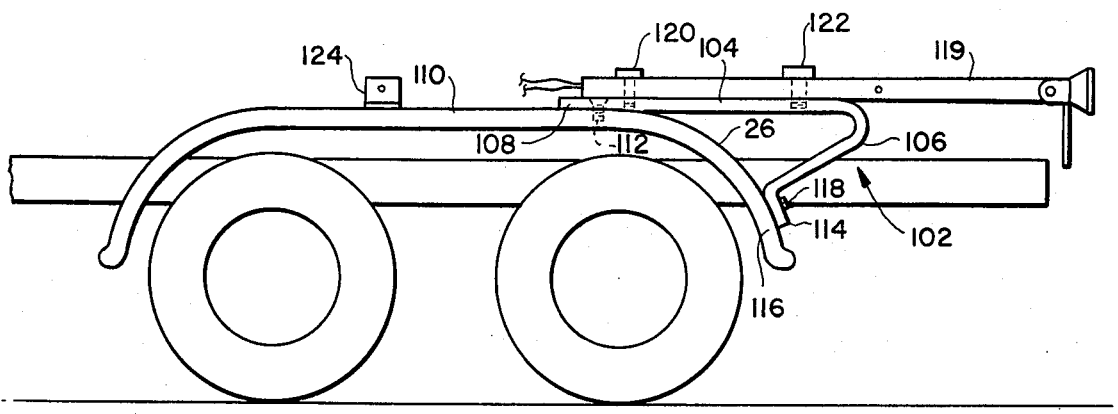
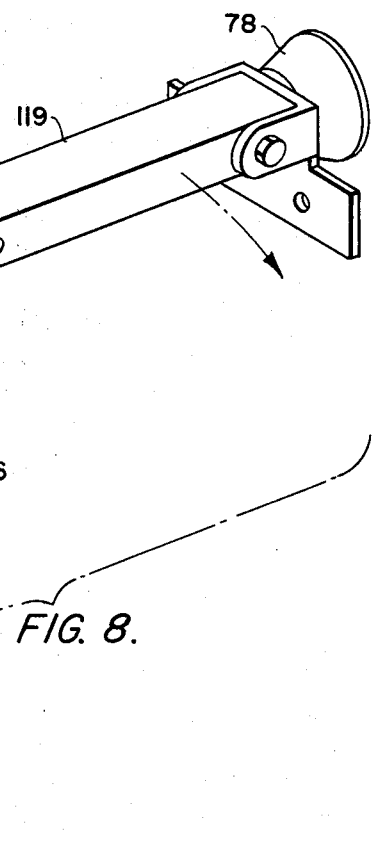
FIG. 7.
FIG. 8.

BOAT TRAILER LAMP AND LICENSE PLATE SUPPORT

BACKGROUND OF THE INVENTION

1. Field of the Invention

This invention pertains to boat trailers having rear lights and license plate supports which are movable to a position where the lamps and associated electrical wiring will not get wet during launching of a boat from the trailer into the water.

2. State of the Prior Art

The prior art shows boat trailer taillight assemblies which are designed to be either removably attached to the boat or boat trailer or are removable so that the lamps will not contact the water during launching. Unlike the present invention, the prior art does not disclose a base attached to the trailer fender and a hollow bar having the trailer lamp and license plate attached at one end thereof and pivotably attached at the opposite end to the base whereby the bar, lamp and license plate are pivotable 180°. This construction permits the lamp to be re-located from the rear of the trailer to the forward end of the trailer during launching of a boat so that the lamp and associated electrical wiring will not contact the water thus preventing dangerous electrical conditions.

Representative of the prior art devices are those listed below.

| Patentee | Patent No. | Issue Date |
| --- | --- | --- |
| N. E. Passman | 2,653,002 | Sept. 22, 1953 |
| H. A. Hartman | 3,229,945 | Jan. 18, 1966 |
| Whitley, Jr. | 3,885,146 | May 20, 1975 |
| Howell | 3,887,093 | June 3, 1975 |
| Renfrow | 4,058,720 | Nov. 15, 1977 |
| Markey | 4,091,442 | May 23, 1978 |

SUMMARY OF THE INVENTION

Boat trailers are required to have running lights so as to be visible during travel at nighttime. Due to electrical hazards which may occur during launching, it became evident that it would be advantageous to provide a support for the lights which would facilitate either removal of the lights from the trailer during launching of the boat or repositioning of the lights so that they would not contact the water causing dangerous electrical conditions or deterioration to the lights and associated electrical wiring.

One of the objects of this invention is to construct a support for boat trailer lamps and license plate which will be inexpensive to produce and simple to install.

Another object of this invention is to provide a support for boat trailer lamps and license plate which is adaptable to either single axle or double axle trailers.

It is yet another object of this invention to provide such a support for the trailer lamps and license plate in the form of a bar which is pivotally attached to a base plate on the trailer fender so that the lamps and license plate may be pivotably repositioned about a vertical arc to a location where they will not come in contact with the water during launching of the boat.

It is yet a further object of this invention to provide a support for boat trailer lamps and license plate which is in the form of a bar hingedly attached to a base plate on the trailer fender so that the lamps and license plate may be swung through a horizontal arc to a position where the lamps, license plate and electrical wiring will not contact the water during launching of the boat.

These and other objects of this invention will become apparent from a consideration of the specification when read in conjunction with the annexed drawings.

BRIEF DESCRIPTION OF THE DRAWINGS

FIG. 4 is a perspective view of another form of the invention showing a support bar pivotally mounted on a base supported on the trailer fender.

FIG. 5 is an exploded view of the support bar assembly.

FIG. 6 is an end view of the support bar showing an exploded view of the lamp and license plate support bracket.

FIG. 7 is yet another form of the invention showing the support bar and base, the latter being of a unitary construction and adapted to fit over the trailer fender.

FIG. 8 is an exploded perspective view of the base, bar and step bracket.

DESCRIPTION OF THE PREFERRED EMBODIMENT

Figure 2:
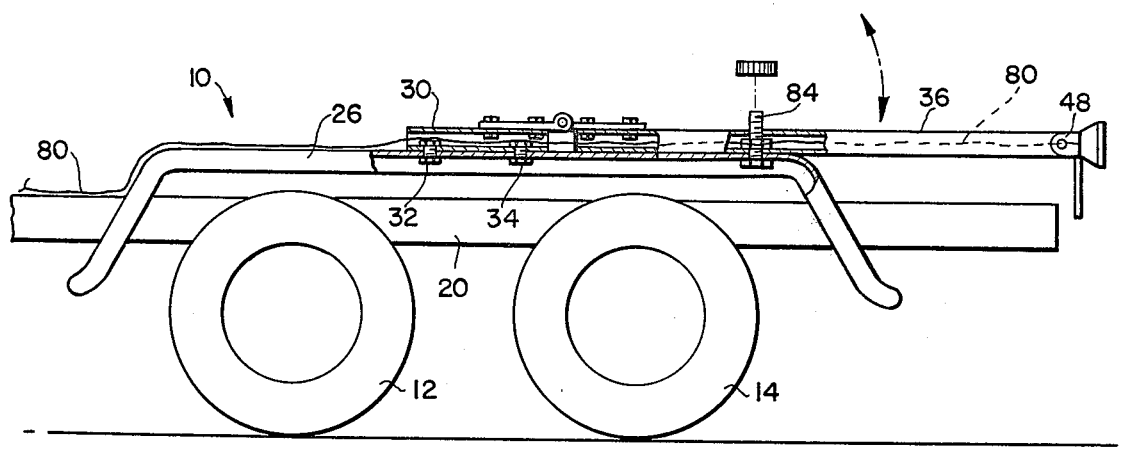
FIG. 2 is a close-up perspective view of the lamp support of FIG. 1.

A boat trailer 10 has standard multiple axle running gear with multiple wheels 12 and 14 (one for each axle shown) as best seen in FIGS. 2 and 7 or a single axle structure with wheels 16 (one shown) as best seen in FIG. 4. The trailer 10 has the usual cradle 20 for supporting a boat 22 having an outboard motor 24.

The wheels of the trailer 10 have fenders 26 (one shown) which span the multiple wheels 12 and 14 as best seen in FIGS. 2 and 7 or fenders 28, (one shown) for the single axle trailer as best seen in FIG. 4.

Figure 3:
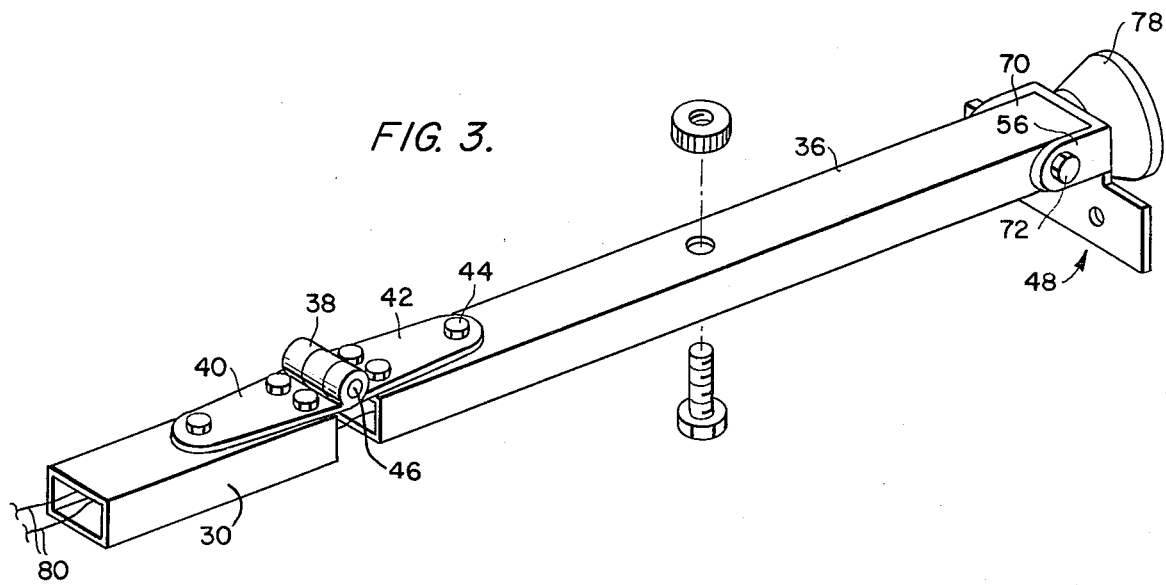
FIG. 3 is a plan view of the hinged bar and base of FIGS. 1 and 2 showing the bar to be hollow so that electrical wiring may extend from the towing vehicle's electrical system to the lamp secured to the end of the bar.

A base plate 30 in the form of a hollow bar, FIGS. 2 and 3, is fastened to the fender 26 by suitable nuts and bolts 32 and 34. This hollow bar is rectangular in configuration but any other configuration also may be used. A second hollow bar 36 is hingedly connected to the plate 30 by a hinge 38 having connecting arms 40 and 42 securely fastened to each of the bars by suitable nuts and bolts shown generally by the numeral 44.

The bar 36 is also rectangular in configuration, however, as in the first bar, any other form may be used. The bar 36 is pivotable about the horizontal axis 46 so that the bar may be swung 180° about a vertical arc as shown by the arrow in FIG. 2.

A bracket 48 has a front lower surface 50, upper surface 51, extension arms 52 and 54 and rearwardly extending parallel arms 56 and 58 having apertures 60 and 62 therein. The arms 56 and 58 are designed to telescope over sides 66 and 68 of the end 70 of the bar 36. The bracket 48 is secured to the end 70 of the bar 36 by inserting a bolt 72 through the apertures 60 and 62 in the arms 56 and 68 and through an aperture 74 in the base. A nut 76 secures the bracket in place.

A lamp 78 is fastened to the upper front surface 51 by suitable bolts (not shown) and electrical wires 80, FIGS. 2 and 3, extend from the towing vehicle's electrical system through the hollow bars to the lamp 78. Identification indicia such as a licensed plate (not shown) may be mounted on the lower surface 50 of the bracket 48.

Figure 1:
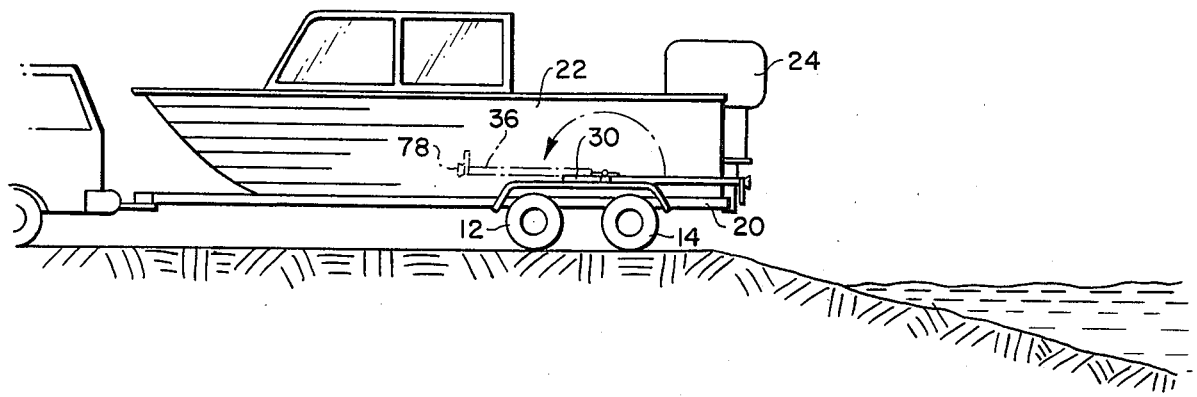
FIG. 1 is a perspective view of a boat and boat trailer wherein the trailer lamp support is hingedly attached to a base which is supported on the trailer fender.

When the boat 22 is being towed to or from the launching ramp, bar 36 is oriented such that the lamp 78 and identification indicia extend beyond the rear of the boat as is required. A hand manipulable nut and bolt 84 is used to secure the bar 36 to the fender 26 during over-the-road travel. When the boat 22 is to be launched, the nut and bolt 84 is removed by hand and the bar 36 is then swung 180° through a vertical arc about lthe pivot axis 46 until the bar lies over and flat against the base 30. By this construction, the lamp 78 and the electrical wiring 80 are repositioned to a forward location where they will not get wet when the trailer is lowered down the ramp and into the water as best seen in FIG. 1.

The advantages of this arrangement over the prior art is the ease by which the trailer lamp support bar may be attached to the trailer fender for normal over-the-road travel and repositionable to a forward position during launching of the boat. This device provides a simple structure which is easily installed and yet provides a means for lessening or eliminating the hazards of electrical shocks due to deterioration of the trailer lamp and the associated electrical wiring as a result of constant contact with the water during launching.

A modified form of the invention is shown in FIGS. 4 and 5. A solid base bar 82 is fastened to the fender 28 by brackets 84 and 86 and nuts and bolts 88. A hollow bar 90 similar to bar 36 is pivotably attached to the bar 82 by a bolt 92 which extends through apertures 94 (one shown in the bar) and aperture 96 in the bar 82. When the trailer is being hauled over the road, the bar 90 with lamp 78 and identification indicia such as a license plate (not shown) is in the rearward position such that the lamp 78 and license plate are behind the trailer as is required. A bolt 98 extends through apertures 99 (one shown) in bar 90 and through an aperture 100 in the bar 82. Prior to launching the boat from the trailer into the water, the bolt 98 is removed by hand and the bar 90 is rotated 180° about the vertical axis of the bolt 92 to a position forward of the trailer fender 28 as best seen in FIG. 4. Electrical wires (not shown) extend from the towing vehicle's electrical system through the hollow bar 90 to the lamp 78.

This device provides a simple structure which is easily installed on the fender of a single axle boat trailer and permits the trailer lamp to be easily and readily repositioned from an over-the-road running position to a position forward of the fender where the lamp and associated electrical wires will not contact the water during launching of the boat.

A further modification of the invention is shown in FIG. 7 and 8. Instead of the separate base bar and brackets 82 and 84 and 86, respectively, a unitary base plate 102 having a top horizontal portion 104 and a downwardly an inwardly extending portion 106 is provided. The end 108 of the base plate is fastened to the upper flat surface 110 of the fender 26 by suitable bolts 112 (one shown). The lower end 114 of the portion 106 is a foot which is fastened to the lower end 116 of the fender by suitable bolts 118 (one shown). A hollow bar 119 is pivotably mounted to the top horizontal portion by a bolt 120. In the over-the-road running condition, the bar 119 is fastened to the top horizontal portion 104 by a suitable hand manipulable bolt 122 so that the lamp 78 and license plate are at the rear of the trailer. Prior to launching the boat, the bolt 122 is removed by hand and the bar 119 swung 180° on the vertical pivot axis of the bolt 120 to a position where the lamp 78 and license plate are forward of the fender 26. An L-shaped bracket 124 secured to the forward end of the fender is adapted to prevent the bar 119 from striking the boat or alternatively to provide a means for securing the bar to the bracket while the boat is being launched.

This device provides a standard base plate adaptable to either the fenders of dual axle trailers or the fenders of single axle trailers. As in the other modifications, this device permits the simple and easy installation of a trailer lamp and license plate support so that the movement of the lamp and license plate from an over-the-road position may be accomplished by simply releasing the bar upon which the lamp is supported and rotating same to a position where the lamp is forward of the fender. Thus, it will be readily evident that by repositioning the lamp forward of the fender, the lamp and associated electrical wiring will not contact the water and thus serious electrical hazards will be prevented.

While the invention has been particularly shown and described with reference to a preferred embodiment thereof, it will be understood by those skilled in the art that various changes in the form and details may be made therein without departing from the spirit and scope of the invention.

What I claim is:

1. A boat trailer lamp and license plate support comprising:
    a hollow base secured to the fender of said trailer;
    a hollow bar spaced from said base a distance, said hollow bar attached to said base by a hinge member and in axial alignment therewith;
    a lamp and license plate attached to said bar;
    electric wiring extending from a power supply through said hollow base and said hollow bar to said lamp for lighting same; and
    said hollow bar pivotable on said hollow base plate by said hinge so that the lamp and license plate may be positioned behind the trailer during over-the-road travel and repositioned forward of the trailer during launching of a boat therefrom whereby the lamp and electric wiring will not contact the water during launching.

2. A boat trailer lamp and license plate support as defined in claim 1, wherein:
    said base is a solid bar attached to the fender by brackets.

3. A boat trailer lamp and license plate support as defined in claim 1, wherein:
    said base is a unitary plate having a top horizontal portion and a lower downwardly and inwardly extending portion, said top horizontal portion secured to the upper horizontal surface of a trailer fender and said lower downwardly and inwardly extending portion secured to the lower portion of said fender.

4. A boat trailer lamp and license plate support as defined in claim 1, wherein:
    said bar is hingedly attached to said base on a horizontal pivot axis whereby said bar may be rotated through a vertical arc from an over-the-road running position where the lamp and license plate are at the rear of the trailer to a position forward of the trailer fender during launching of a boat whereby the lamp will not contact the water thus avoiding dangerous electrical conditions.

5. A boat trailer lamp and license plate support as defined in claim 1, wherein:
said bar is pivotably attached to said base on a vertical pivot axis whereby said bar may be rotated through a horizontal arc from an over-the-road running position where the lamp and license plate are at the rear of the trailer to a position forward of the trailer fender whereby the lamp will not contact the water thus avoiding dangerous electrical conditions.

6. A boat trailer lamp and identification indicia support comprising:
a base secured to the fender of said trailer;
a hollow bar pivotably attached to said base at one end thereof;
a bracket having an upper surface, a lower surface and parallel rearwardly extending arms;
said bracket attached to the opposite end of said bar by said arms;
a lamp attached to the upper surface of said bracket;
identification indicia attached to the lower surface of said bracket;
electrical wires extending from the vehicle's electrical system through said bar to said lamp for lighting same, and
said bar pivotable so that the lamp and identification indicia are repositionable from the rear of the trailer during over-the-road travel to a position forward of the trailer fender prior to launching of a boat whereby the lamp and associated electrical wiring will not contact the water thus avoiding deterioration of the lamp and electrical wiring and avoiding dangerous electrical conditions.

* * * * *